United States Patent Office.

RUDOLF C. WITTMANN, OF NEW YORK, ASSIGNOR TO HIMSELF AND CHARLES NELSON, OF EAST NEW YORK, N. Y.

MANUFACTURE OF ARTIFICIAL STONE.

SPECIFICATION forming part of Letters Patent No. 293,207, dated February 5, 1884.

Application filed July 12, 1883. (No specimens.)

*To all whom it may concern:*

Be it known that I, RUDOLF C. WITTMANN, a citizen of Austria, residing at New York, in the county and State of New York, have invented new and useful Improvements in the Manufacture of Artificial Stone, of which the following is a specification.

This invention relates to an artificial stone prepared by exposing a mixture of a salt of magnesia—such as carbonate or silicate of magnesia—and a binding material—such as carbonate of lime—to the action of muriatic acid.

In carrying out my invention I have obtained satisfactory results by proceeding as follows: I take carbonate of magnesia, one part; carbonate of lime, one part. These ingredients are finely pulverized, and then they are intimately mixed, and the mixture is treated with muriatic acid, a sufficient quantity of this acid being used to moisten the mass. This moistened mass is distributed in suitable molds and exposed to pressure, and after the pressed articles have been removed from the molds they are left to dry.

In forming tiles or flat plates from my compound, an article of superior strength and durability may be produced by introducing into the mold a bottom layer of the moistened mass, then placing upon this layer an intermediate layer of wood, pasteboard, muslin, or of a material of similar nature, then a top layer of the moistened mass, and finally exposing the whole to pressure. The mass is white; but, if desired, suitable pigments may be mixed with the same, as may be desirable, and the article produced from it may be ornamented to suit the taste of the public.

Instead of carbonate of magnesia, I can use other salts of magnesia—such as silicate of magnesia—and in place of carbonate of lime I can use other binding material, such as sulphate of lime or fluor-spar.

If desired, a metallic oxide or salt may be added, such as oxide of zinc, oxide of lead, carbonate of zinc, or carbonate of lead. The proportion in which the ingredients are used must be changed according to the nature of the materials, which may be more or less pure.

What I claim as new, and desire to secure by Letters Patent, is—

1. An artificial stone prepared by mixing together a salt of magnesia—such as carbonate or silicate of magnesia—and a binding material—such as carbonate of lime—then adding to this mixture a sufficient quantity of muriatic acid to moisten the mass, and finally compressing this mass in suitable molds, substantially as described.

2. An artificial stone prepared by mixing together a salt of magnesia—such as carbonate or silicate of magnesia—and a binding material—such as carbonate of lime—then adding to this mixture a sufficient quantity of muriatic acid to moisten the mass, then introducing into a suitable mold a bottom layer of this moistened mass, an intermediate layer of pasteboard, wood, muslin, or equivalent material, and a top layer of the moistened mass, and finally compressing the whole, substantially as set forth.

In testimony whereof I have hereunto set my hand and seal in the presence of two subscribing witnesses.

RUDOLF C. WITTMANN. [L.S.]

Witnesses:
W. HAUFF,
E. F. KASTENHUBER.